(12) United States Patent
Fang et al.

(10) Patent No.: US 7,234,899 B2
(45) Date of Patent: Jun. 26, 2007

(54) CUTTING TOOL HAVING A WIPER NOSE CORNER

(75) Inventors: X. Daniel Fang, Brentwood, TN (US); David J. Wills, Brentwood, TN (US)

(73) Assignee: TDY Industries, Inc., Pittsburgh, PA (US)

( * ) Notice: Subject to any disclaimer, the term of this patent is extended or adjusted under 35 U.S.C. 154(b) by 231 days.

(21) Appl. No.: 10/440,740

(22) Filed: May 19, 2003

(65) Prior Publication Data

US 2004/0234348 A1 Nov. 25, 2004

(51) Int. Cl.
*B23B 27/14* (2006.01)
*B23B 27/16* (2006.01)

(52) U.S. Cl. .......................... 407/113; 703/2

(58) Field of Classification Search ............... 407/113; 700/182; 703/1, 2; 345/419, 420; *B23B 27/14, B23B 27/16*
See application file for complete search history.

(56) References Cited

U.S. PATENT DOCUMENTS

| | | | | |
|---|---|---|---|---|
| 3,806,713 | A * | 4/1974 | Ryberg | 318/573 |
| 4,760,548 | A * | 7/1988 | Baker et al. | 708/270 |
| 5,226,761 | A * | 7/1993 | Satran et al. | 407/114 |
| 5,246,315 | A * | 9/1993 | Hansson et al. | 407/114 |
| 5,377,116 | A | 12/1994 | Wayne et al. | |
| 5,408,598 | A * | 4/1995 | Pryor, Jr. | 345/442 |
| 5,634,745 | A * | 6/1997 | Wiman et al. | 407/113 |
| 6,100,904 | A * | 8/2000 | Gupta | 345/442 |
| 6,244,791 | B1 * | 6/2001 | Wiman et al. | 407/114 |
| 6,623,217 | B2 * | 9/2003 | Brockett et al. | 407/114 |
| 6,655,881 | B2 * | 12/2003 | Shimizu | 407/113 |
| 6,684,742 | B1 * | 2/2004 | White | 82/1.11 |
| 6,715,967 | B2 * | 4/2004 | Wiman et al. | 407/114 |
| 6,835,028 | B2 * | 12/2004 | Usui et al. | 407/114 |

FOREIGN PATENT DOCUMENTS

| | | |
|---|---|---|
| EP | 0 285 660 A | 10/1988 |
| EP | 1 205 877 A | 5/2002 |
| WO | WO 95/00272 A | 1/1995 |

OTHER PUBLICATIONS

Bourke, Paul. "Spline Curves (in 3D)". Internet article, 'Online!, Nov. 1995, XP002300113. Retrieved from the Internet: URL:http://astronomy.swin.edu.au/{pbourke/curves/spline/index.html.
European Patent Office, acting as International Searching Authority. "Written Opinion of the International Searching Authority (PCT Rule 43*bis*.1)." Nov. 8, 2004.

* cited by examiner

*Primary Examiner*—Monica Carter
*Assistant Examiner*—Sara Addisu
(74) *Attorney, Agent, or Firm*—Kirkpatrick & Lockhart Nicholson Graham LLP

(57) ABSTRACT

The invention is directed towards cutting inserts having a top surface, a bottom surface, at least three side surfaces extending from the top surface to the bottom surface, and a nose corner connecting two adjacent side surfaces. The intersection of the cutting insert may include an intersection of the nose corner and the top surface wherein at least a portion of the intersection defined by a multi-segment spline curve. The multi-segment spline curve may be a B-spline curve. The intersection may also be defined by two arcs at each end of the B-spline curve. The invention also includes a method of designing a turning insert having the steps of designing a nose corner with multi-segment spline curve. The multi-segment spline curve may be a B-spline curve. The method may be a computer implemented method of designing a turning insert having the steps of determining the shape and size of the desired turning insert, determining the desired contact mode between the turning insert and the machining surface at a specific lead angle, and developing a B-spline curve that is smoothly and tangentially connected to the two arcs symmetrical to the bisector line of nose corner.

15 Claims, 11 Drawing Sheets

CUTTING TOOL HAVING A WIPER NOSE CORNER

TECHNICAL FIELD AND INDUSTRIAL APPLICABILITY OF THE INVENTION

The present invention relates to material cutting tools. The present invention more particularly relates to turning inserts and other cutting tools including at least one wiper corner. The cutting tools and turning inserts of the present invention are especially suited for metal finishing applications. The present turning inserts also may be suitably adapted for various types of turning operations including, for example, roughing, light roughing, and finishing.

BACKGROUND OF THE INVENTION

It is well known to employ material cutting tools for turning operations wherein chips are removed from workpieces being machined. A turning operation is a machining process for forming external surfaces on a workpiece by the action of a cutting tool, usually on a rotating workpiece. Typically, the workpiece is mounted on a lathe. Most metal removal in lathe turning is accomplished by cutting tools with a single point in contact with the workpiece. These cutting tools may be produced in one piece from a solid bar of tool steel with the appropriate cutting edge ground on one end. They also may be constructed in two pieces, typically including a holder and a turning insert made of carbide or some other hard material. The turning insert of the two-piece tool may be held in place mechanically holder. Brazed, soldered, or welded inserts typically may be resharpened, while inserts held in place mechanically usually are removed, discarded, and replaced with a new, sharp insert after they become worn. Carbide turning inserts manufactured from powdered metals have replaced one-piece ground carbide tools in most turning applications due to their low cost and high wear resistance.

FIG. 1 is a end view of a typical turning operation of a cylindrical workpiece 10 being turned with a two piece cutting tool including a typical turning insert 12 secured in a holder 14. The workpiece 10 is being rotated on a lathe (not shown) about an axis of rotation 16. The turning operation is set up to turn to a depth 18 with a clearance angle 15. FIG. 2 is a plan view of turning insert 12. Turning insert 12 is a diamond shape turning insert with an 80° nose corner angle 26 on nose corner 24. The main cutting edge 22 move in the direction of feed to perform most of the cutting of the workpiece while the secondary cutting edge 20 performs significantly less cutting of the workpiece.

The American National Standards Institute (ANSI) has developed standard nomenclature for identification of replaceable turning inserts. Each ANSI standard insert is identified by a nine digit alphanumeric string that specifically identifies the features of the insert. Insert holders are also designed according to ANSI standards for uniformity. Each holder is designed to accommodate and securely hold ANSI standard inserts. The nine digit alphanumeric string specifies the following features of a turning insert: shape, clearance, tolerance, type, size, thickness, corner, edge condition, and hand. A typical turning insert numerical signature could be, for example, SNMG432AR, and the meaning of an ANSI alphanumeric string for a turning insert will be apparent to those of ordinary skill in the art. ANSI standard turning inserts typically have a nose corner radius of between 1/16 inch and 1/4 inch.

The efficiency and quality of turning operations depends on the cutting parameters set on the lathe, the characteristics of the cutting insert, and the characteristics of the material being turned. The relevant cutting parameters include, for example, the feed rate, the lead angle of the turning insert, and workpiece rotational speed. Machinists attempt to optimize these parameters based on the turning insert employed and the material being turned to obtain the highest feed rate while achieving the required surface quality on the finished product.

Tremendous forces are exerted on a turning insert during a typical cutting operation. As the insert begins to cut, it is subjected to large compressive forces. The insert experiences widely varying axial and radial forces as the turning insert moves through the workpiece due to constantly changing chip thicknesses. High axial forces can cause vibration and chatter. Conversely, high radial forces can cause the workpiece to move in the lathe causing poor tolerances and poor surface quality.

The lead angle of the insert on the lathe primarily dictates the relative magnitude of axial and radial cutting forces produced. The lead angle also has a significant influence on the way the radial and axial forces are exerted on the workpiece and the turning insert during a typical machining operation. The lead angle is defined as the angle between the main cutting edge and the direction of feed. The forces that the workpiece exert upon the turning insert change as the lead angle is adjusted. As the lead angle increases, the radial forces decrease and the axial forces increase. Using a lead angle of 45° and a standard radius nose corner insert, the radial and axial forces exerted upon the turning insert are approximately equal. Machinists must attempt to balance these forces in order to optimize surface smoothness and dimensional accuracy.

The shape and features of an insert are also critical to the efficiency and quality of the turning process. The nose radius is a curve defined by the edge of the insert that connects the main cutting edge to the secondary cutting edge. A conventional turning insert has a single radius, with the edge of the insert that connects the main cutting edge and the secondary cutting edge being a segment of a circle with a constant radius. A turning insert with a relatively large radius will produce a finished workpiece with the best surface quality. However, a larger nose radius will increase the cutting forces, both axially and radially, required to perform the turning operation and often results in poor chip control.

Vibration of the workpiece and the lathe may also occur when using a turning insert with a large nose radius in a turning operation. Vibrations may adversely affect the smoothness of the turned metal surface and, also, the service life of the turning insert. Therefore, the use of a turning insert having a large nose radius in metal turning operations is very limited. However, for rough machining operations, an insert with a large nose radius provides the strongest cutting surface and, therefore, the longest service life. Accordingly, round, square or rectangular inserts with a large radius are, typically, chosen for roughing applications.

For metal finishing operations, a triangular, trigon, or diamond-shaped turning insert with a small nose radius is usually selected to produce the smoothest finished surface. Turning inserts with a smaller cutting tip angle (i.e., the angle between the main cutting edge and the secondary cutting edge.) and a smaller nose corner radius allow greater control of the forces generated in the turning operation and provide a smoother surface on the finished workpiece. Such inserts are not as strong as turning inserts with larger radius nose corners and larger cutting tip angles and, therefore, have a higher wear rate and shorter service life.

Accordingly, there exists a need for a turning insert that combines the advantages of both a small nose radius and a larger nose radius. In an attempt to address that need, wiper turning inserts have been developed. As used herein, a "wiper turning insert" is a turning insert that has a radius that is not a curve of constant radius between the main cutting edge and the secondary cutting edge. U.S. Pat. No. 5,634, 745, for example, describes a turning insert that includes a nose corner defining at least five circle segments between the main cutting edge and the secondary cutting edge. The design solution provided by the insert of the '745 patent is limited in that the transition between one circle segment and the adjacent segment is abrupt, though tangent, and constrained to certain limitations. The nose corner of the turning insert of the '745 patent is limited in that it may only be described by circle segments. In addition, the largest radius among the multiple circle segments as described in the patent '745 is limited to less than 8 or 10 mm. The research under the present invention indicates that an arc radius beyond 10 mm would not only benefit the surface finish but also reduce the sensitivity of surface finish variations due to inevitable manufacturing inaccuracy of both cutting inserts and tool holders.

Thus, there remains in the art a need for a turning insert that can provide smooth surface finish on a machined surface over a wide range of cutting conditions. There also exists a need for a turning insert that combines the advantages of small nose radius turning insert with the advantages of larger nose radius turning inserts. There is also a need for a method of designing a wiper insert manufacturing a nose corner having smooth no-abrupt transition point sand large radius arcs.

SUMMARY OF THE INVENTION

In one embodiment, the present invention is directed towards cutting inserts having a top surface, a bottom surface, at least three side surfaces extending from the top surface to the bottom surface, and a nose corner connecting two adjacent the side surfaces. The intersection of the cutting insert may comprise an intersection of the nose corner and the top surface wherein at least a portion of the intersection defined by a multi-segment spline curve. The multi-segment spline curve may be a B-spline curve. The intersection may also be defined by two arcs at each end of the B-spline curve. In certain embodiments, the two arcs have a radius greater than 10 mm.

An embodiment of the invention also includes a method of designing a turning insert comprising the step of designing a nose corner comprising multi-segment spline curve. The multi-segment spline curve may be a B-spline curve. In another embodiment the method is a computer implemented method of designing a turning insert comprising the steps of determining the shape and size of the desired turning insert, determining the desired contact mode between the turning insert and the machining surface at a specific lead angle, and developing a B-spline curve that is smoothly and tangentially connected to the two arcs symmetrical to the bisector line of said nose corner.

The reader will appreciate the foregoing details and advantages of the present invention, as well as others, upon consideration of the following detailed description of embodiments of the invention. The reader also may comprehend such additional details and advantages of the present invention upon using the invention.

BRIEF DESCRIPTION OF THE DRAWINGS

The features and advantages of the present invention may be better understood by reference to the accompanying drawings in which.

DESCRIPTION OF EMBODIMENTS OF THE INVENTION

The present invention provides a turning insert incorporating a nose corner at least partially defined by a non-constant radius, piece wise polynominal basis function, such as, multi-segment spline curve as an improvement over nose corners of conventional turning inserts that are defined by curves of constant radius or numerous segments of a circle. Embodiments of the turning insert may additionally comprise two adjacent circular arc segments. Therefore, turning inserts having the wiper nose corner of the present invention may be designed to combine the advantages of a turning insert with a small nose radius and the advantages of a turning insert with a large nose radius.

Figure 1:
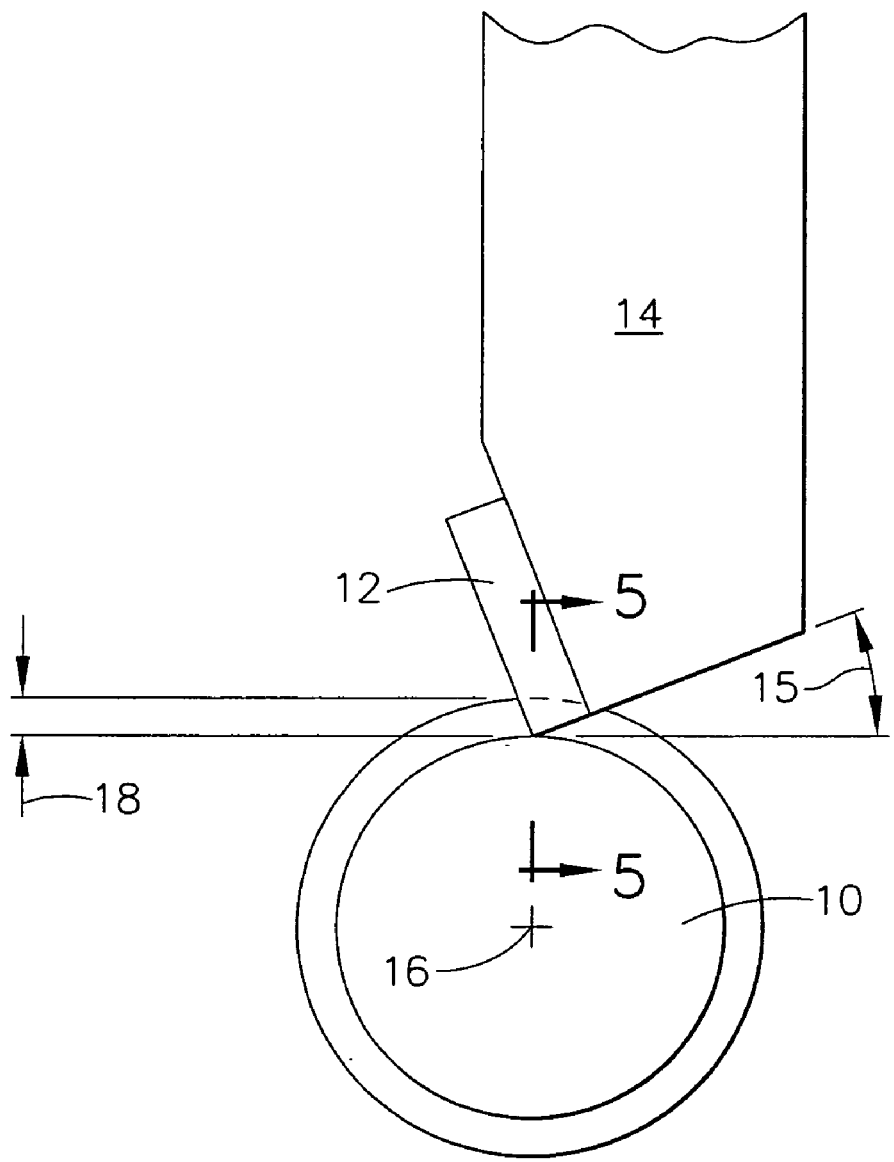
FIG. 1 is a view illustrating a typical turning operation using a cylindrical workpiece with cutting tool comprising a turning insert secured in a holder.
Figure 2:
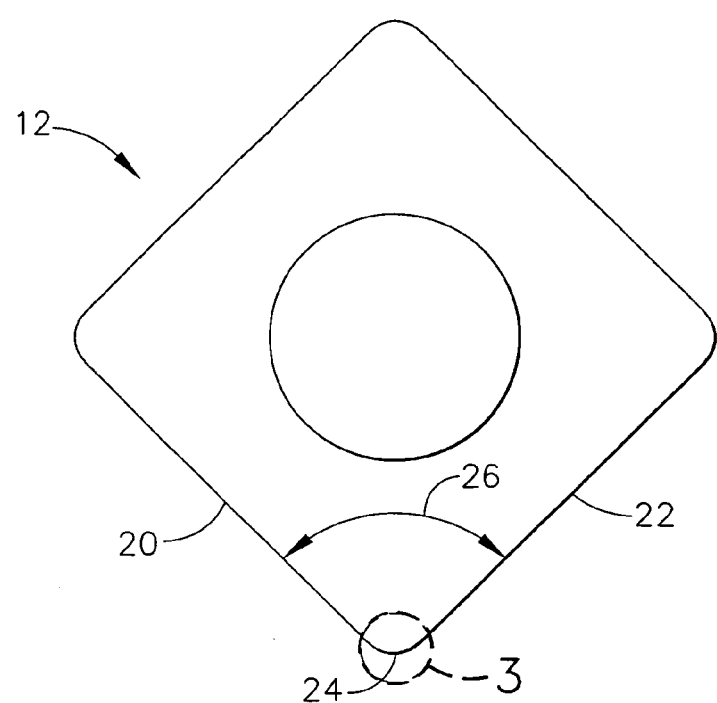
FIG. 2 is a top plan view of a conventional turning insert with a constant radius nose corner.
Figure 3:
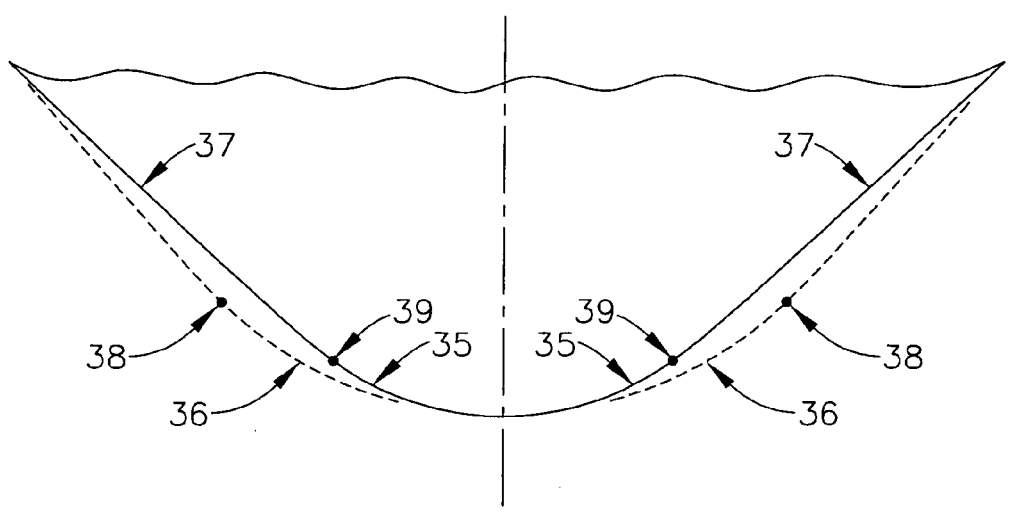
FIG. 3 is an enlarged top plan view of a nose corner illustrating an embodiment of the wiper nose corner constructed according to the present invention superimposed over the constant radius nose corner of the conventional turning insert of FIG. 2.

FIG. 3 is an enlarged top plan view of a nose corner illustrating the difference between an embodiment of the nose corner constructed according to the present invention and the constant radius nose corner of the conventional turning insert (illustrated in FIGS. 1 and 2). The conventional turning insert has a constant radius nose corner 36. The wiper nose corner 35 of the present invention may be specifically designed to provide a turning insert with unique design and manufacturing flexibility. Embodiments of the wiper nose corner may additionally include arcs on either side of the multi-segment spline curve. The arcs may be of any radius. Preferably, the radius of the arcs is between 0.1 mm and 20 mm. However, arcs of greater than 10 mm may be advantageous in certain applications the nose corner may also be adjusted to meet any desired location along the nominal nose corner 36, nose corner angle 26, etc. with desired radius of the arcs 37. In addition, the shape of the wiper nose corner may be easily designed to suit different types of turning inserts to obtain improved performance of surface finish in machining.

In geometric modeling of two or three dimensional objects, lines and circles (or arcs as a portion of a circle) may be the basic elements forming a complex or free-form curve. Complex curves are required when designing items such as, for example, automobiles, ships, airplanes, and other articles, where various shape constraints must be met. The standard representation of a curve is the well-known polynomials. The constant radius nose corners of the conventional turning inserts are defined by a basic polynomial equation, such as:

$$x^2+y^2=r^2$$

where r=radius of the nose corner

The cutting edges of the turning insert may be defined by straight lines according to linear equation, such as $$y = \left(\tan\frac{\theta}{2}\right)x + \frac{r}{\cos\frac{\theta}{2}}$$

where r=radius of the nose corner, and θ=cutting tip angle of the insert

However, in geometric modeling, defining complex curves with a polynomial equation is generally inadequate. Typically, a designer may lay out a series of control points that define the shape of the curve to be developed. A curve may be generated using mathematical modeling techniques and then the various parameters controlling the model are varied to fine tune and finish the design. For single segment polynomial mathematical modeling these parameters include the polynomial degree and the control points. The major shortcoming of single segment polynomial modeling is that polynomials require a high polynomial degree in order to satisfy a large number of constraints and to accurately fit most complex curves. Also, a single-segment curve as defined by a polynomial equation is not well-suited to interactive shape design because of the difficulty in controlling the shape of the curve in a localized segment of the curve without modifying the shape of the curve over its entire length.

A multi-segment spline curve, such as those utilized by the present invention combines curve segments, typically that are individual polynomial curves. into a single smooth curve. The polynomial curve segments may be of a relatively low polynomial degree, however, and still be sufficiently flexible to describe a complex curve. Comparatively, for improved design flexibility with a conventional single polynomial curve, a large number of control points must be defined and inserted into a polynomial equation of high degree. For example, to model a nose corner defined by 8 control points, a polynomial equation of degree equal to 7 is required. See The NURBS Book, published by Springer-Verlas, New York 1997, Les Piegl and Wayne Tiller, hereby incorporated by reference. A polynomial equation of such high degree is difficult to calculate, and the ultimate shape of the curve is difficult to anticipate with a change in a single control point. To minimize the polynomial degree of the curve and still obtain the required design flexibility, a multi-segment spline curve may be used. Multi-segment spline curves may use a large number of control points independent of their polynomial degree since they are generated by connecting several polynomial segments together into a single curve. Each segment has a significantly lower polynomial degree than would be required by a single polynomial curve to model similar curves. The degree of the polynomial segments may be selected by the tool designer independently of the number of control points and, therefore, independently of the complexity of the curve design. In most cases, a cubic (degree 3) multi-segment spline curve would be sufficient to construct a complex free-form curve for designing a turning insert nose corner.

The nose corners from the prior art are limited to only a single arc or a combination of circular arcs. Circular arcs may be formed by a polynomial of the second degree. Therefore, the nose corners of the prior art have limited design capabilities and can have some difficulties to achieve smooth transition among different wiper nose segments when requiring a large radius arc.

The algorithms developed for multi-segment spline curves can be described as follows:

$$B(u) = \sum_{i=0}^{n} N_{i,k}(u) P_i$$

where $P_i$ is the set of control points.

$N_{i,k}$ represents the (k−1) degree B-spline blending function which is determined by the following recursive equation:

$$N_{i,0}(u) = \begin{cases} 1 & \text{for } u_i \leq u < u_{i+1} \\ 0 & \text{otherwise} \end{cases}$$

$$N_{i,k}(u) = \frac{u - u_i}{u_{i+k} - u_i} N_{i,k-1}(u) + \frac{u_{i+k+1} - u}{u_{i+k} - u_{i+1}} N_{i+1,k-1}(u)$$

where $[u_i, \ldots, u_{i+k}]$ is a knot vector of the B-spline wiper nose.

By changing the knot vector, one can obtain different shapes of a wiper nose profile; by changing the number of control points, one can adjust the fit accuracy and the smoothness of the wiper nose; and by defining the location of the control points, one can control the overall shape of the nose curve profile. Knots are the intervals in a B-spline curve within which the basis or blending function is defined or blended with control points to generate a single-piece, smooth, flexible, and parametrically-controllable B-spline curve. The number of knots is the sum of the control points plus the curve degree plus one.

Figure 4:
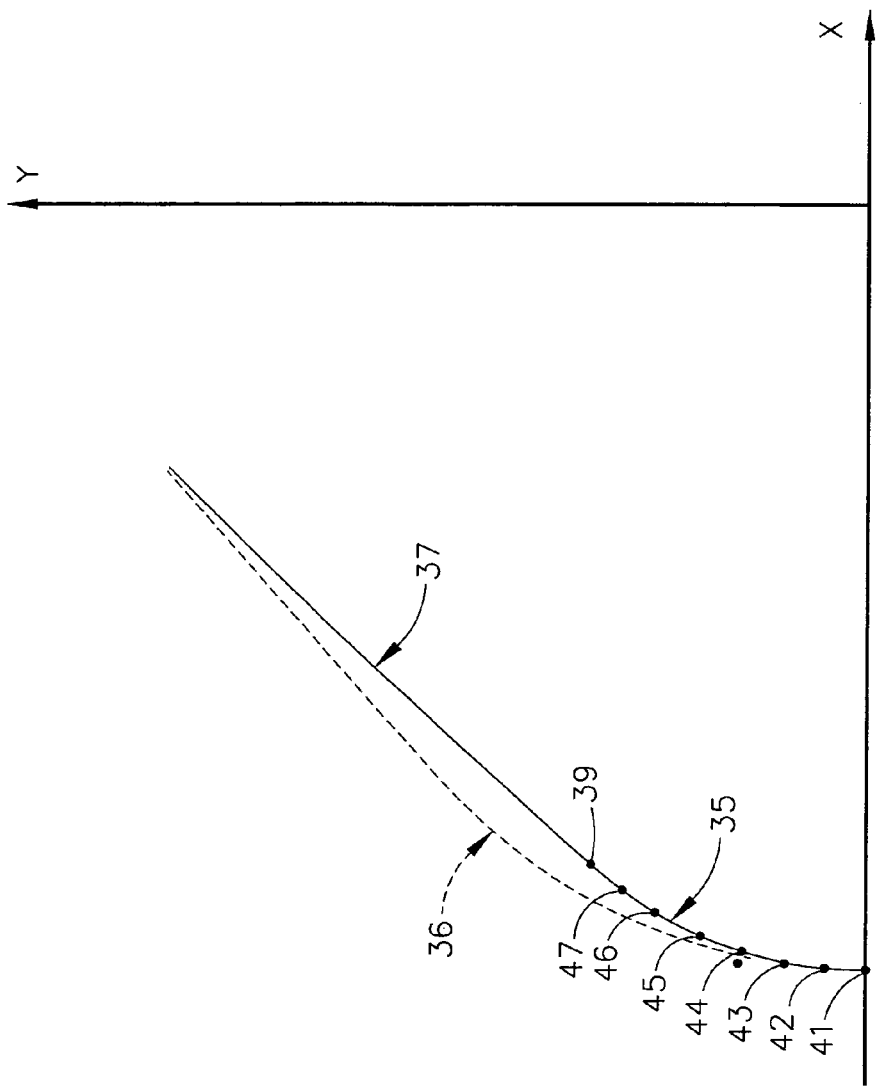
FIG. 4 is a graph of one half of the wiper nose corner design of the wiper nose corner of FIG. 3 depicting the control points used to define the multi-segment spline curve.

An embodiment of the nose curve of the present invention is shown in FIG. 4. The conventional nose corner 36 may be described by the polynomial equation above for circular arcs. The only variable that may be adjusted is the radius of the arc. The wiper nose corner 35, however, may be described by the equations of a B-spline curve. This curve may be modified by increasing or decreasing the number of control points 39, 41 through 47 for the embodiment shown in FIG. 4, changing the location of a control point, changing the degree of the spline curve or changing the number or location of the knots.

As an example, a single segment spline curve according the above equation with polynomial degree of 3, 2 endpoints and 2 control points may be defined by the following equations:

$$x(t) = a_x t^3 + b_x t^2 + c_x t + x_0$$

where:

$$x_1 = x_0 + \frac{c_x}{3},$$

$$x_2 = x_1 + \frac{c_x + b_x}{3},$$

$$x_3 = x_0 + c_x + b_x + a_x;$$

$$y(t) = a_y t^3 + b_y t^2 + c_y t + y_0$$

where:

$$y_1 = y_0 + \frac{c_y}{3},$$

$$y_2 = y_1 + \frac{c_y + b_y}{3},$$

$$y_3 = y_0 + c_y + b_y + a_y;$$

Solving the above equations for the coefficients results in the following equations:

$$c_x = 3(x_1 - x_0)$$

$$b_x = 3(x_2 - x_1) - c_x$$

$$a_x = x_3 - x_0 - c_x - b_x$$

$$c_y = 3(y_1 - y_0)$$

$$b_y = 3(y_2 - y_1) - c_y$$

$$a_y = y_3 - y_0 - c_y - b_y$$

Once the two endpoints, $(x_0, y_0)$ and $(x_3, y_3)$, control points, $(x_1, y_1)$ and $(x_2, y_2)$, and the interval, t, are defined, the complete B-spline curve is defined and may be drawn.

More easily, B-spline curves may be drawn by commercially available software products, such as UNIGRAPHICS Version 17, since the solution to the equations involves complex recursive mathematics. These commercially available software products allow the user to define the curve degree, the number and location of the control points and end points, and the number of knots to incorporate in the curve. The software may allow the curve to be manipulated by adjusting any of these parameters to modify the curve design to the final shape. This process may be reiterated until the wiper nose corner is designed to meet the machinists requirements. In certain embodiments, polynomial curves with degree from 2 to 6 may be used to produce curves with sufficient flexibility for designing nose corners. Preferably, polynomial curves of a degree of from 2 to 4 produce a curve of sufficient flexibility without requiring as much calculation as curves of higher polynomial degree. A B-spline nose 35 can be adjusted to fit smoothly into a large-radius arc 37 without an abrupt transition, as shown in FIG. 4 where point 39 is the intersection point of B-spline curve 35 and large radius arc 37.

Figure 5:
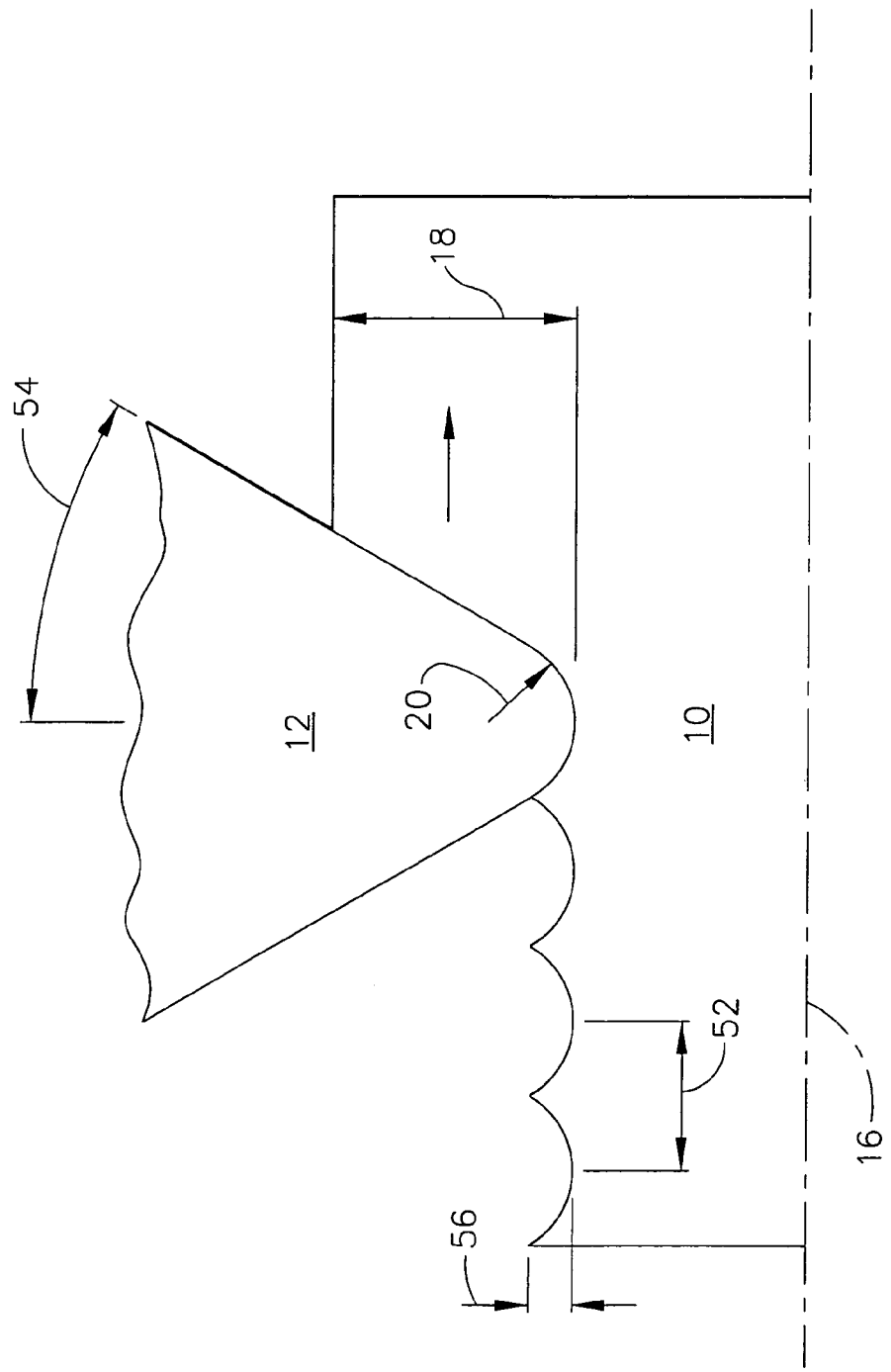
FIG. 5 is a partial cross-sectional view of the turning operation depicted in FIG. 1 utilizing the conventional turning insert of FIG. 2.
Figure 6:
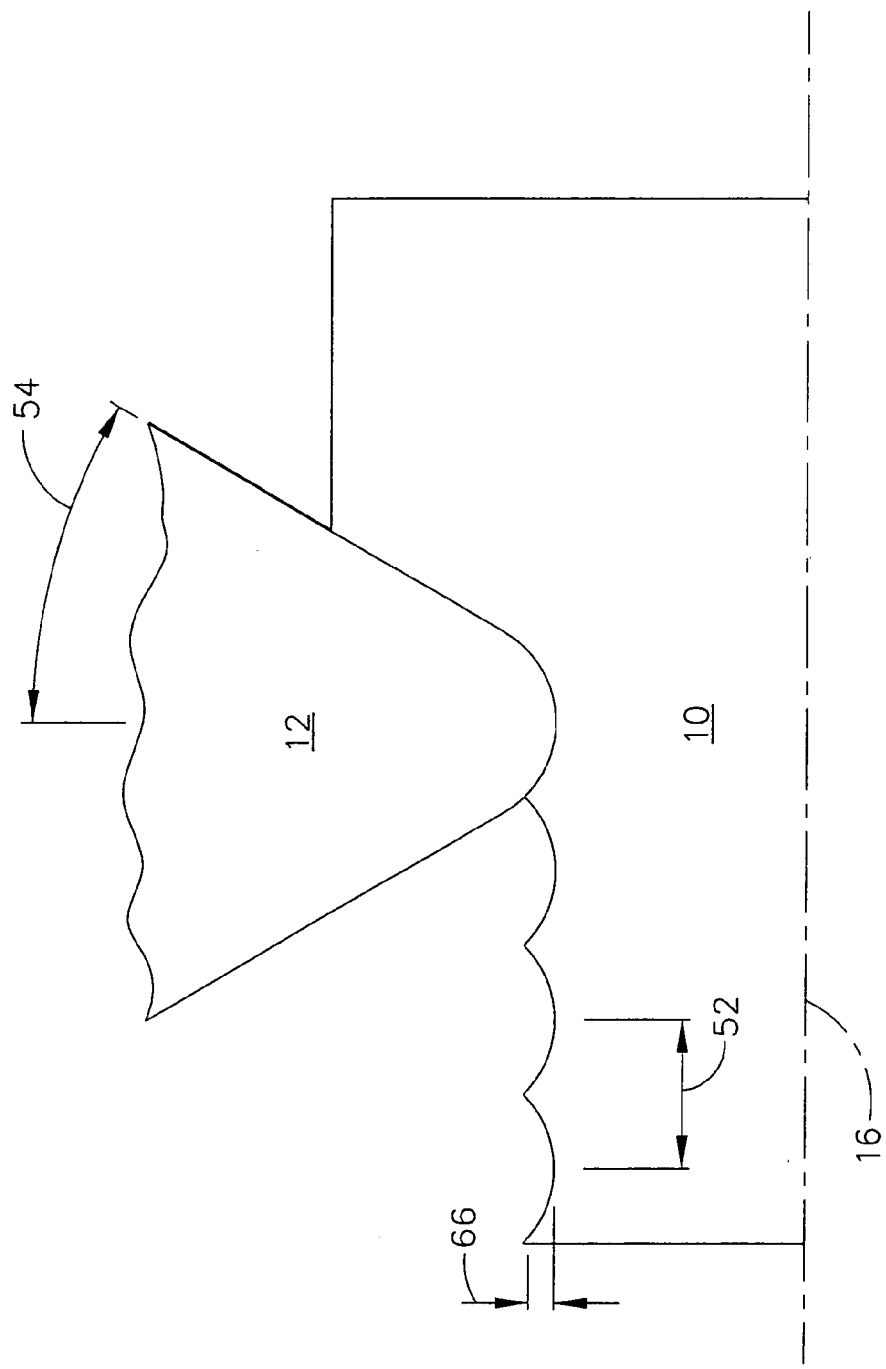
FIG. 6 is a partial cross-sectional view of the turning operation depicted in FIG. 1 utilizing a turning insert having an embodiment of the wiper nose corner of the present invention constructed as shown in FIG. 3.

FIG. 5 and FIG. 6 are partial cross-sectional views of the turning operation depicted in FIG. 1. FIG. 5 depicts the turning operation utilizing the conventional turning insert 36. FIG. 6 depicts the turning operation utilizing the turning insert of FIG. 3 with an embodiment of the wiper nose of the present invention. In FIG. 5, the turning insert 12 has a conventional circular arc nose corner with a constant radius 20. The turning insert 12 cuts through the workpiece 10 and is set with a lead angle 54 and a depth of cut 18. The feed rate may be determined by the distance 52 between subsequent cuts divided by time taken for the lathe to rotate the workpiece 10 one complete rotation about the axis 16. The surface roughness 56 and 66, FIGS. 5 and 6, is determined by the shape and style of the turning insert utilized in the turning operation and the feed rate. As can readily be seen when comparing FIG. 6 to FIG. 5, the surface roughness 66 of the turning insert with the wiper nose corner is less than the surface roughness 56 of a conventional turning insert with all other machining parameters held constant.

Figure 7:
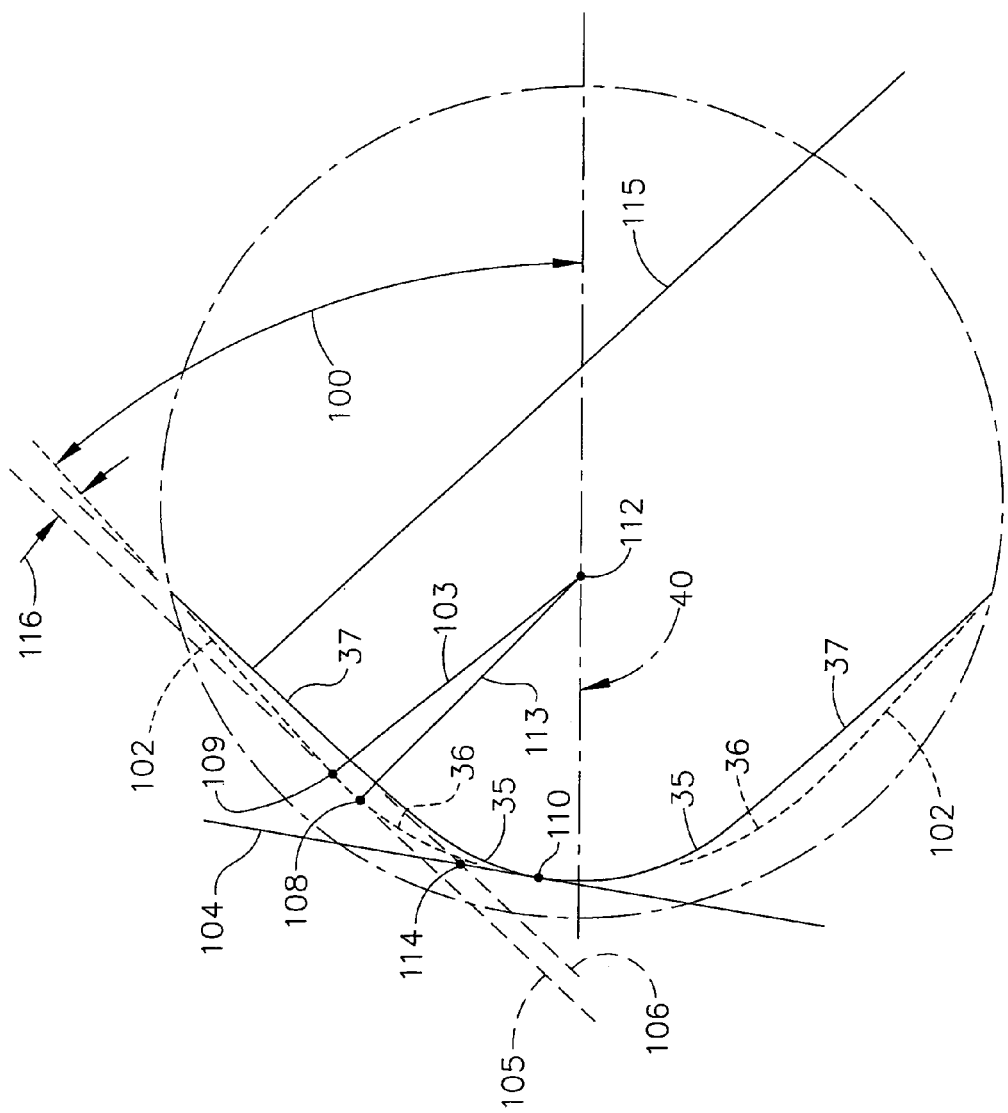
FIG. 7 illustrates a portion of an embodiment of the method of locating the control points for designing the multi-segment spline curve for a wiper turning insert of the present invention.

A graphical method of locating control points and designing a multiple segment is also provided by the present invention. As an example, a detailed procedure is given below to describe how an embodiment of the turning insert having a wiper nose corner nose profile may be produced. The method of the present invention includes selecting a conventional standard turning insert, and modifying the nose corner to form a B-spline curve. The first step of the graphical method is to determine the basic parameters that define the general characteristics of the turning insert. In this example, the turning insert will be a diamond shaped insert, such as shown in FIG. 2. A portion of the corner of the conventional standard turning insert 12 to be modified is shown in FIG. 7. In FIG. 7, the coordinate origin or the center of the circular nose corner is the nose center 112. As an example, a diamond shaped turning insert is used here that has an corner angle of 80°, the bisected angle 100 is therefore 40°. The original nose profile 36 is a conventional standard turning insert nose corner having a circular nose profile of constant radius as defined by the length of radius line 103. The conventional standard turning insert also includes an original straight cutting edge 102. The original nose profile 36 and the original straight cutting edge 102 join at intersection point 109. Radius line 103 is shown to extend from the intersection point 109 to the nose center 112.

The next step of the method of the present invention is to determine the approximate machining parameters for which the turning insert will be used. In the present example, the wiper turning insert will be designed for use with a machining lead angle of approximately 5°. A lead angle line 105 may be drawn at the design machining lead angle with respect to the original straight cutting edge 102. The lead angle line 105 is drawn tangent to the original nose profile 36 at the lead angle point 108. An intersection line 113 may be drawn from the lead angle point 108 to the nose center 112.

The boundary within which the wiper nose is designed may then be determined. The boundary line 106 may be a line offset and parallel to the lead angle line 105, or may be a line offset and at a slight angle with respect to lead angle line 105. The design of line 106 will be dependent mainly on the corner angle, the nose radius, and the size of the insert. As illustrated in the embodiment in FIG. 7, the boundary line 106 may be offset and tilted slightly to lead line 105.

The entire wiper profile will then be formed by an arc 37 with a large radius 115 tangent to the boundary line 106, and a B-spline nose profile 35 that is confined by the boundary line 104 and smoothly connected to the arc 37. Since the center line 40 is also a symmetrical line of the entire corner, the entire wiper profile is actually constructed by a single piece multi-segmented B-spline 35 and two arcs 37 symmetrical to the center line 40 of the nose corner, as shown in FIG. 7. In this embodiment, the two arcs 37 have a radius larger than ten (10) millimeters and symmetrically located on the two sides of the center line 40 of the nose corner.

Due to the nature of B-spline curves, the B-spline nose profile 35 can be adjusted easily and fitted smoothly to the two arcs 37 having different arc radii 115, or in other words, there is no limit on the size of the arc radius 115. However, a larger radius is preferred, such as, greater than ten (10) millimeters. Different insert sizes, nose radii, and insert shapes may require different arc radii 115 to get the optimal performance. As an example, the arc radius 115 used in an embodiment provided in this invention is 13.5 millimeters.

Figure 8:
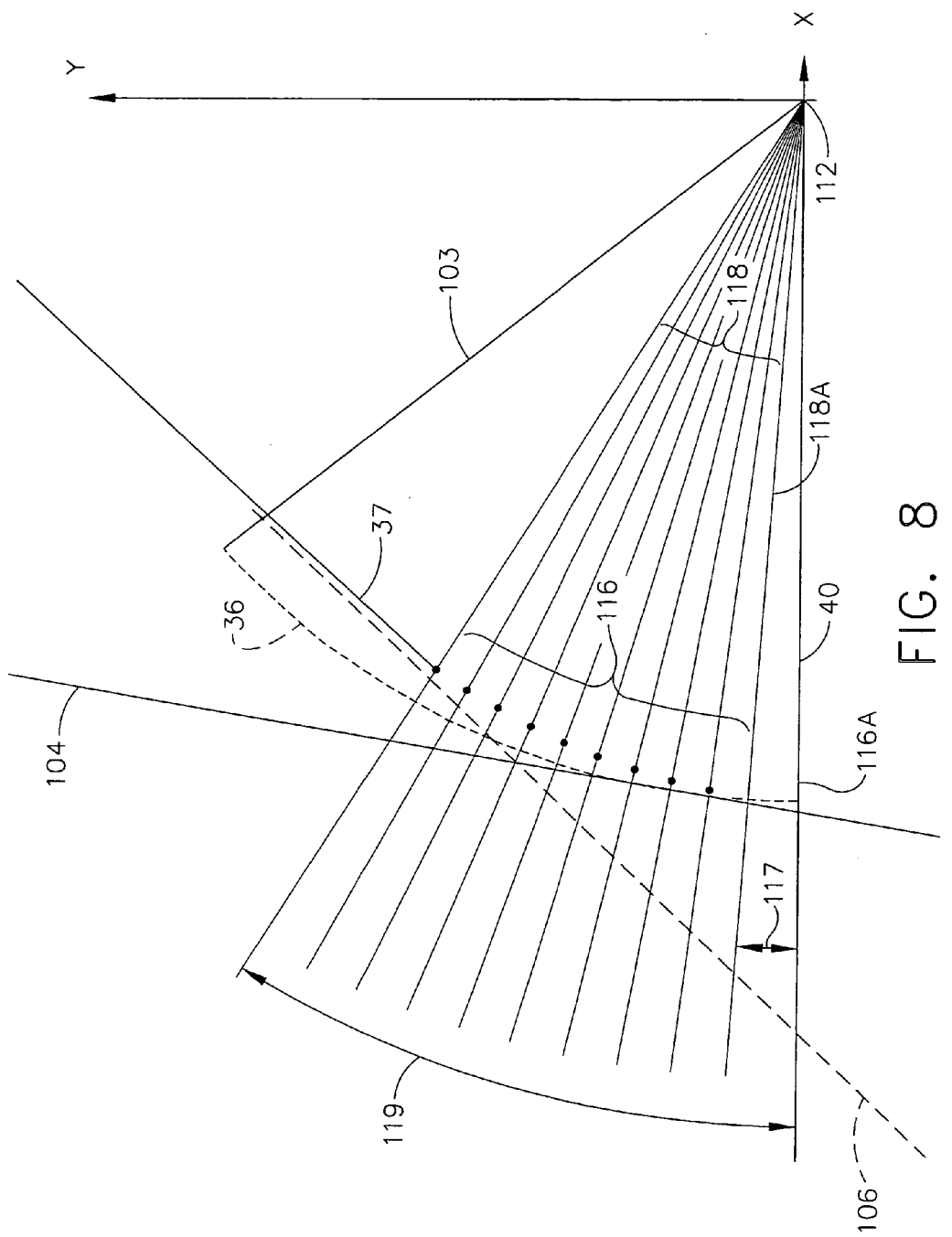
FIG. 8 further illustrates an embodiment of a method of FIG. 7 for locating the control points of the wiper turning insert.

One embodiment of the method of designating the B-spline nose 35 is shown in FIG. 8. The first control point line 40 (center line 40) plus a series of control point lines 118 may be drawn to help define the B-spline wiper insert of the present invention. Each of the control point lines 118 originates at the nose center 112 and may be described by the following equation:

$$Y_i = \tan[90° - (\theta_0 + \Delta\theta)] * x_i;$$

wherein $\theta_0$ is the starting angle 117 measured from the center line 40 to the second control point line 118A; $\Delta\theta$ is the angle increment, i.e. the ending angle 119 subtracted by the starting angle 117, then divided by (k-1), wherein k is the number of the control point lines 118. Then a series of control points 116, in total (k+1), may be created. All the control points are limited to the right side of the boundary lines 104 and 106. The general rule used for locating all the control points is to create a smooth B-spline curve which is smoothly tangent and connected to the large-radius arc 37. The tangent line of the B-spline curve at the control point 11 6A on the center line 40 should be perpendicular to the center line 40. The starting angle 117 may be either the same or different than the angle increment between control lines 118.

The present invention is also directed to a method of designing turning inserts having wiper nose corners. The multi-segment spline corner nose algorithm developed in this invention provides a smooth and flexible wiper nose and also provides a universal method to easily construct a wiper nose for any type of turning insert, including, but not limited to, rhombic with any corner angle, triangular, square, and trigon. Use of B-spline curve algorithm of the present invention allows for the design of optimal wiper nose profiles for specific cutting applications, such as turning inserts for specific machining lead angles having any of the above mentioned turning insert shapes. And also there is no limit on the range of the large arc 37 which plays a critical role in achieving the desired surface finish.

The arc 37 having a large radius plays a very important role in determining the surface finish during the turning operations using a wiper nose insert. Theoretically speaking, a wiper nose insert with a portion of straight line profile would be better than that with curved profile with an arc radius in regard to the surface finish obtained during the machining processes. However, there are always some inevitable manufacturing errors or tolerances or inaccuracy on both the carbide insert and the tool holder used to position the insert. A wiper nose insert having a straight line portion is very sensitive to such errors or tolerances, thus may result in unsatisfactory surface finish. Therefore, an arc with a large radius is less sensitive to the above-mentioned manufacturing errors or tolerances, or operation inaccuracy. In generally, the larger radius, the better performance of a wiper nose insert, in regard to the surface finish and the sensitivity to those errors, tolerances or inaccuracy in reduced.

The initial offset from the line 105 to the line 106 can be initially determined based on the machining lead angle to be used. Then the entire wiper nose profile including the B-spline curve 35 and the arc 37 having a large radius 115 can be determined according to the size of the insert, the nominal corner nose radius, and the estimated surface finish. The offset may need to be re-adjusted as necessary until one achieves the optimal wiper nose profile.

Figure 9A:
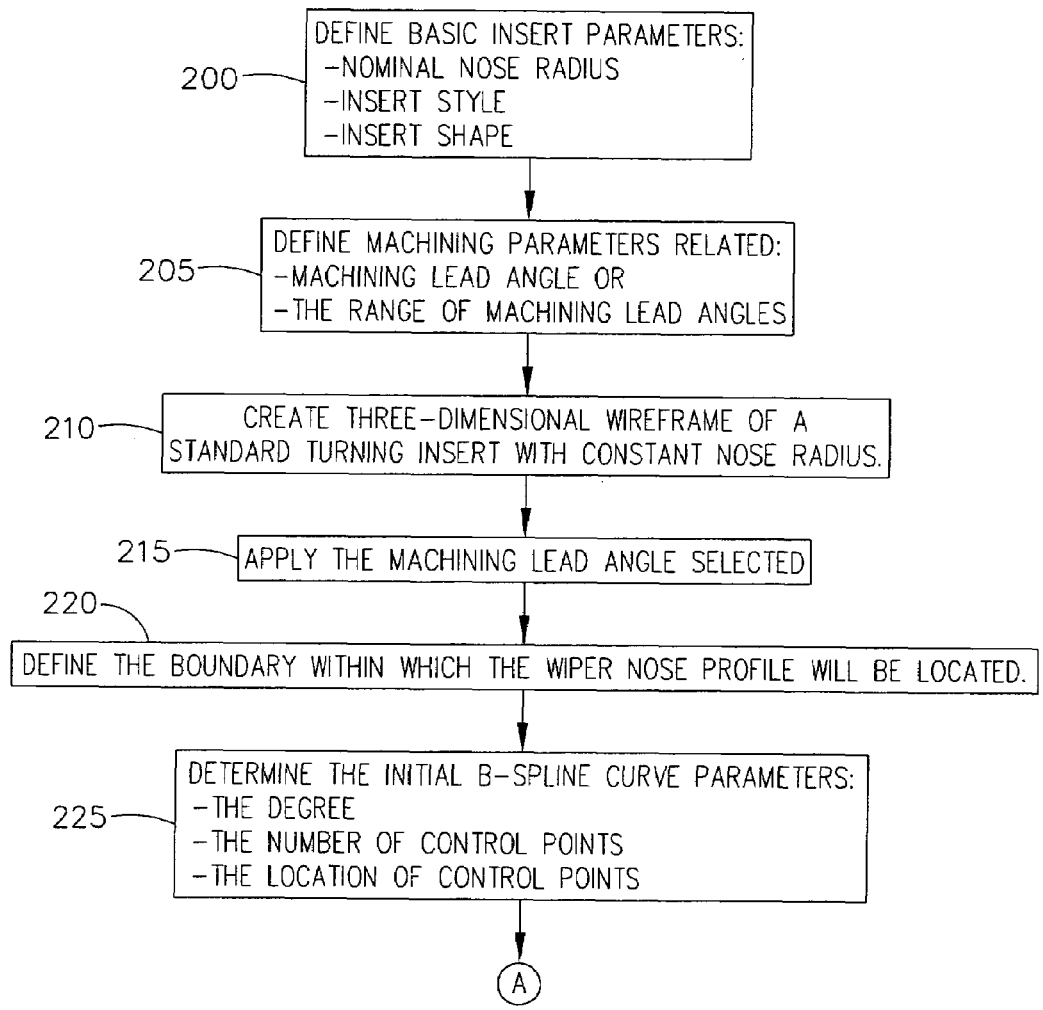
FIGS. 9A and 9B are flow diagrams of a method of the present invention for designing and manufacturing a turning insert incorporating a multi-segment spline curve nose corner of the present invention.
Figure 9B:
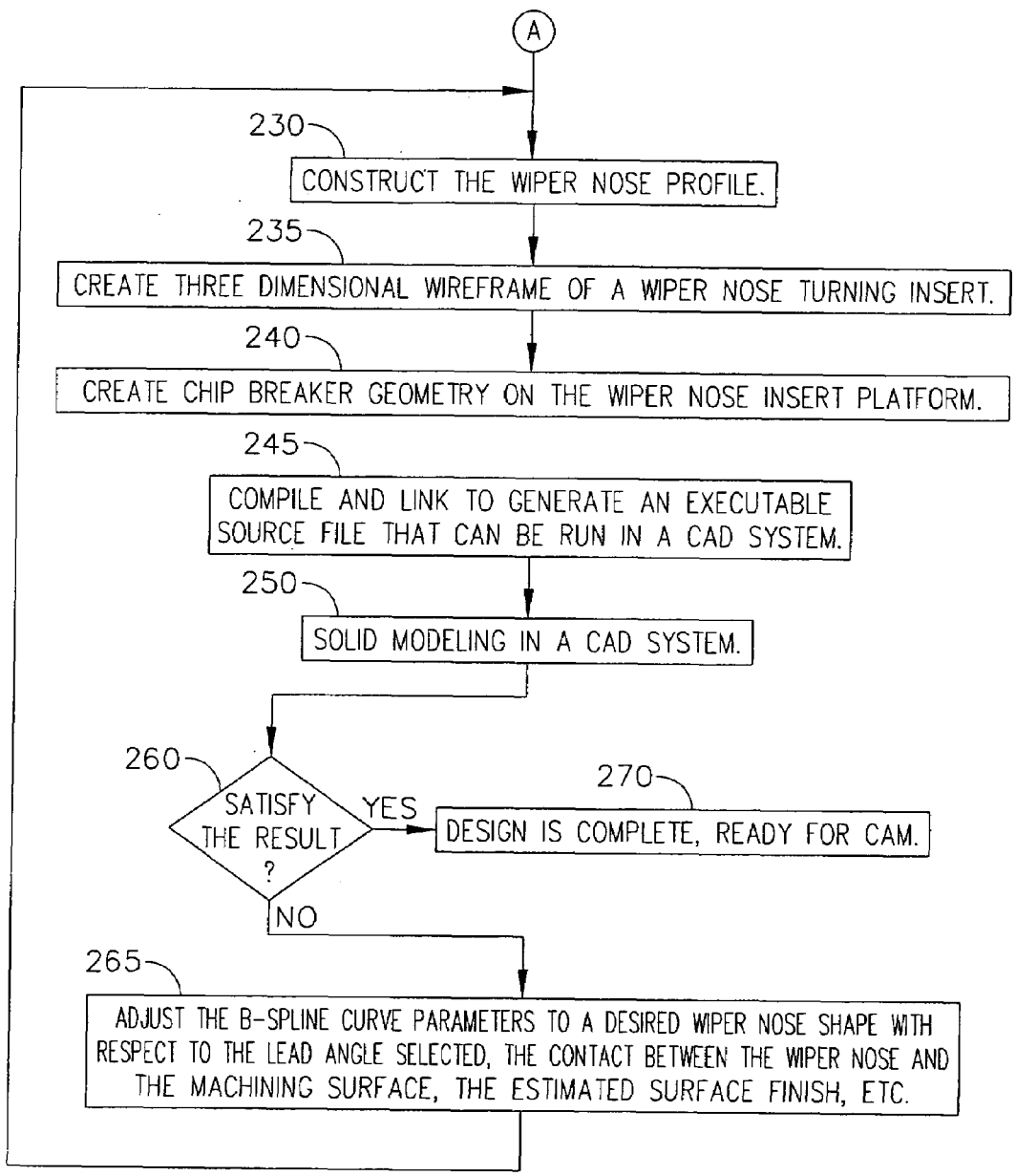

FIGS. 9A and 9B are flow diagram that depicts one method for design of a wiper nose insert. As illustrated in FIG. 9A, the first step 200 provides for defining the basic insert parameters of a conventional insert that is to be used to design the wiper nose corner, such as, the nominal nose radius, the style of the insert, and shape of the insert. The next step 205 is to define how the insert may be used in the lathe, such as the lead angle. A lead angle may be determined at this point so the wiper nose designer may design a mode of contact into the wiper nose depending on the application to be conducted with the insert. A three dimensional wire frame computer generated model may be generated if the method is computer implemented or a graphical model may be developed as described earlier in step 210, as shown in FIG. 10. The lead angle or range of lead angles determined in step 205 is then applied to the model in step 215 to begin to define the area to be modified into a wiper nose insert. The rest of the boundary within which the wiper nose will be located is defined in step 220. The wiper nose boundary may enclose the entire conventional nose corner or a small segment thereof depending on the designers criteria for modification of the nose corner.

In step 225, the designer determines the parameters for the B-spline nose and the large arc which will define the curve, such as, the polynomial degree, the number and location of the control points, as well as other parameters that will control the final shape of the developed curve. The entire wiper nose profile is then constructed in step 230 based on the parameters defined in step 225. A three dimensional wire frame model, see FIG. 10, of a wiper insert is developed, step 235, and chip breaking geometry may be added, step 240, on the platform of the wiper insert, if desired, for chip formation control. In step 245, the design developed in the preceding steps is compiled and linked to generate an executable source file for a Computer Aided Design ("CAD") system. The CAD software is then used to develop a solid model of the wiper turning insert design in step 250. The designer reviews the design, step 260, and decides whether or not further modification is required. The design of the wiper nose may be modified as indicated in step 265 by modification of the parameters used to form the solid model of the wiper nose turning insert. Such modifications include, but are not limited to, the lead angle, the mode of contact desired, the machining surface, the surface finish, the number and location of the control points, the degree of the polynomial segments and the radius of large arcs. Once the designer is satisfied with the solid model of the wiper turning insert, the design is complete and the wiper turning insert may be produced using conventional manufacturing techniques, such as, for example, computer aided manufacturing, step 270.

Figure 10:
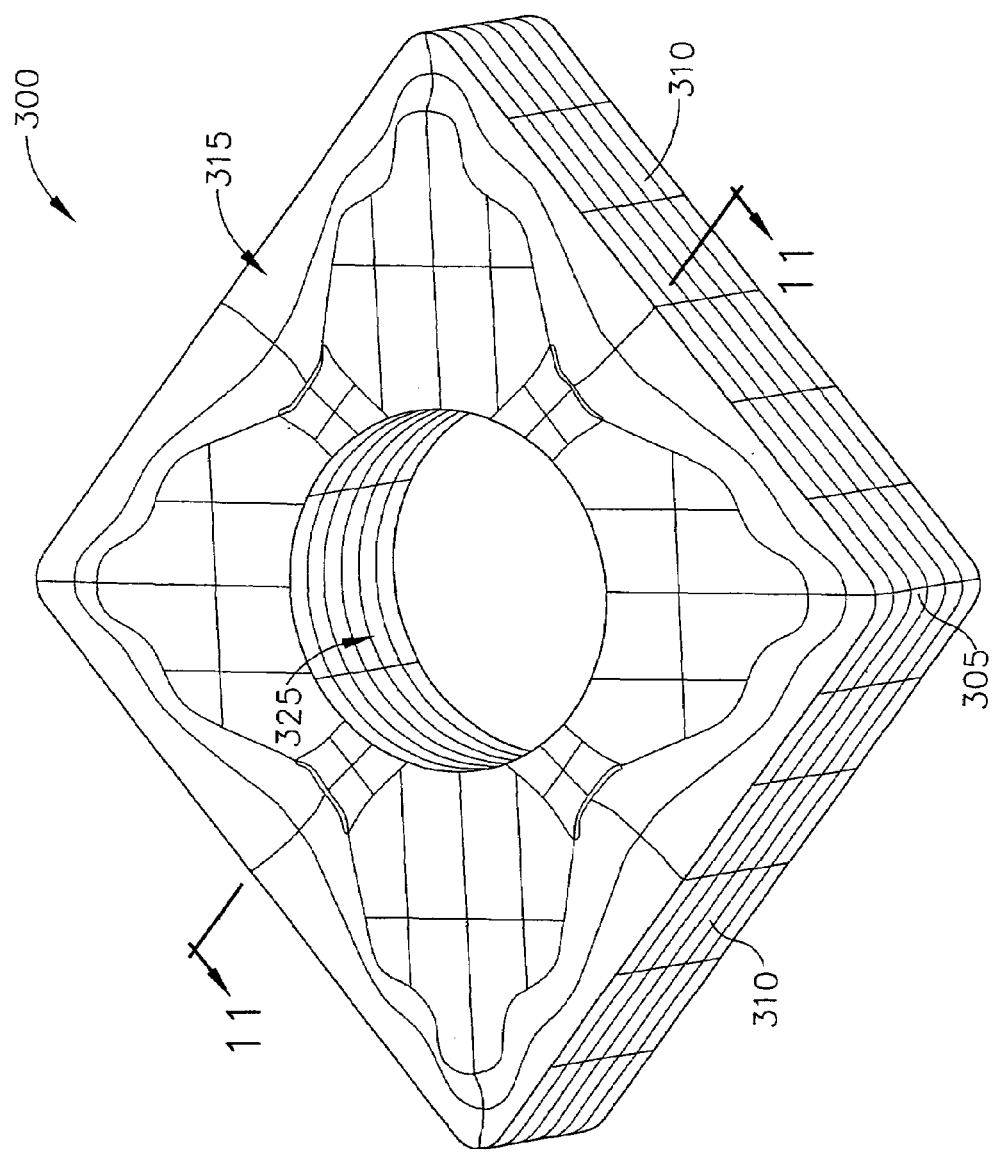
FIG. 10 is a wire frame model of an embodiment of a turning insert of the present invention.
Figure 11:
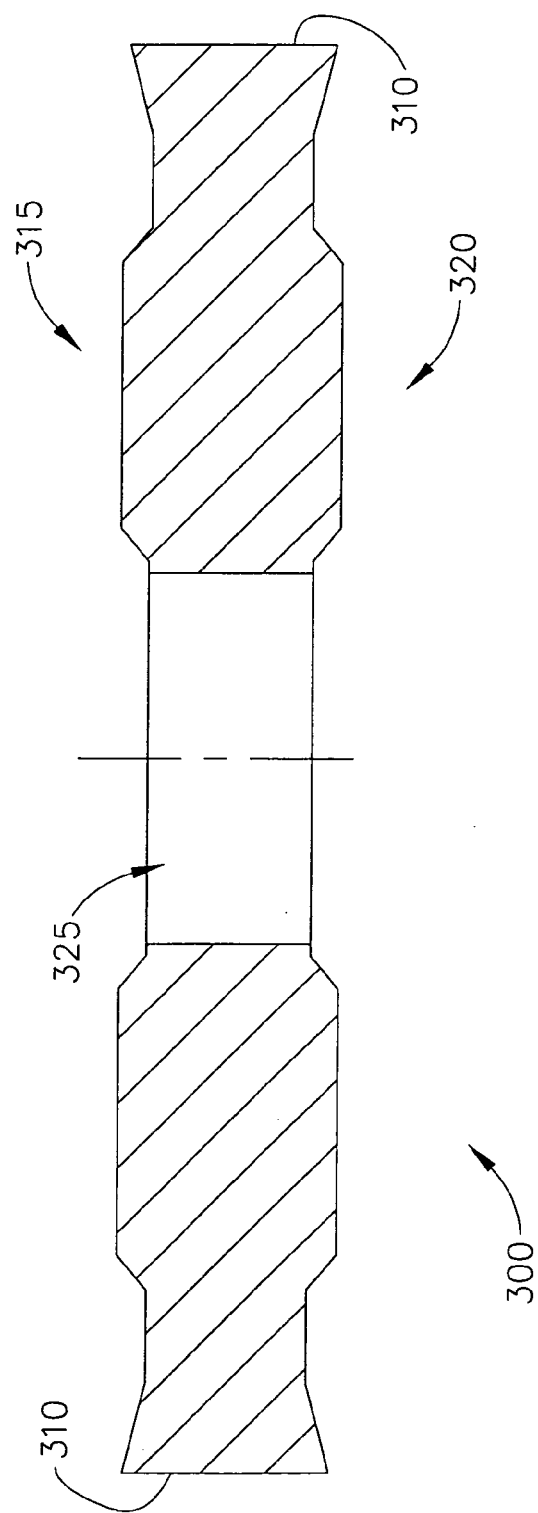
FIG. 11 is a cross-sectional view of the wire frame model of the embodiment of the turning insert shown in FIG. 10.

A wire frame model of a turning insert of the present invention is shown in FIGS. 10 and 11. The turning insert 300 has a top surface 315 with chip breaking geometry and side surfaces 310 extending from the top surface 315 to the bottom surface 320, indicated on FIG. 11. The side surfaces 310 are connected at a nose corner 305. The turning insert 300 may include a bore 325 therethrough to facilitate fastening the insert 300 to a turning insert holder.

Although the present invention has been described in connection with certain embodiments, those of ordinary skill in the art will, upon considering the foregoing description, recognize that many modifications and variations of the invention may be employed. All such variations and modifications of the present invention are intended to be covered by the foregoing description and the following claims.

We claim:

1. A cutting insert comprising:
a top surface;
a bottom surface;
at least three side surfaces extending from the top surface to the bottom surface;
a nose corner connecting two adjacent the side surfaces;
an intersection of the nose corner and the top surface;
at least a portion of the intersection defined by a B-spline curve wherein the B-spline curve has a polynominal degree of from 2 to 6.

2. The cutting insert of claim 1, wherein the intersection is further defined by two arcs at each end of the B-spline curve.

3. The cutting insert of claim 2, wherein the two arcs have a radius greater than 10 mm.

4. The cutting insert of claim 2, wherein the B-spline curve and the arcs form the nose corner.

5. The cutting insert of claim 2, wherein the B-spline curve is symmetrical about a bisector of the nose corner.

6. The cutting insert of claim 2, wherein the B-spline curve defines a surface extending from the top surface to the bottom surface.

7. The cutting insert of claim 1, wherein the B-spline curve defines a continuously changing radius along the portion of the nose corner.

8. The cutting insert of claim 3, wherein each of the two arcs are connected smoothly and tangently to each end of the B-spline curve.

9. A cutting insert, comprising:
a top surface;
a bottom surface;
at least three side surfaces extending from the top surface to the bottom surface;
a nose corner connecting two adjacent the side surfaces;
an intersection of the nose corner and the top surface, wherein at least a portion of the intersection is defined by a B-spline curve wherein two arcs at each end of the B-spline curve, and the two arcs have a radius greater than 10 mm and the B-spline curve has a polynominal degree of from 2 to 6.

10. The cutting insert of claim 9, wherein each of the two arcs are connected smoothly and tangently to each end of the B-spline curve.

11. The cutting insert of claim 9, wherein the B-Spline curve is symmetrical about a bisector of the nose corner.

12. The cutting insert of claim 9, wherein the B-Spline curve defines a surface extending from the top surface to the bottom surface.

13. A cutting insert comprising:
a top surface;
a bottom surface;
at least three side surfaces extending from the top surface to the bottom surface;
a nose corner connecting two adjacent the side surfaces;
an intersection of the nose corner and the top surface, wherein at least a portion of the intersection is defined by a B-spline curve and two arcs at each end of the B-spline curve, wherein the B-spline curve has a polynomial degree of from 2 to 6.

14. The cutting insert of claim 13, wherein the B-Spline curve is symmetrical about a bisector of the nose corner.

15. The cutting insert of claim 13, wherein the B-Spline curve defines a surface extending from the top surface to the bottom surface.

* * * * *

UNITED STATES PATENT AND TRADEMARK OFFICE
CERTIFICATE OF CORRECTION

PATENT NO. : 7,234,899 B2  Page 1 of 1
APPLICATION NO. : 10/440740
DATED : June 26, 2007
INVENTOR(S) : Fang et al.

It is certified that error appears in the above-identified patent and that said Letters Patent is hereby corrected as shown below:

On the Title Page Item -56-
Other Publications, delete "1995" and substitute -- 1996 --

Col. 1, line 32, delete "in place mechanically holder." and substitute --in place mechanically with a screw or other fastener, or by brazing, soldering, or wielding the insert directly to the holder.--

Col. 11, line 20, delete "curve wherein the B-spline" and substitute --curve, wherein the B-spline--

Col. 11, line 20, delete "B-spline curve has a polynominal" and substitute --B-spline curve has a polynomial--

Col. 11, line 37, delete "cutting insert of claim 3, wherein" and substitute --cutting insert of claim 4, wherein--

Col. 12, line 4, delete "three side surfaces extending from" and substitute --three side surfaces, extending from--

Col. 12, line 6, delete "two adjacent the side surfaces" and substitute --two adjacent side surfaces--

Col. 12, line 11, delete "B-spline curve has a polynominal" and substitute --B-spline curve has a polynomial--

Signed and Sealed this

Twenty-ninth Day of July, 2008

JON W. DUDAS
*Director of the United States Patent and Trademark Office*